United States Patent
Hawley et al.

[11] Patent Number: 6,029,981
[45] Date of Patent: Feb. 29, 2000

[54] TUBE PLUG SEAL

[75] Inventors: Frank Dean Hawley, Macomb; Matthew David Lutzke, Utica, both of Mich.

[73] Assignee: Form Rite Corporation, Auburn Hills, Mich.

[21] Appl. No.: 08/954,143

[22] Filed: Oct. 20, 1997

Related U.S. Application Data

[60] Provisional application No. 60/043,931, Apr. 21, 1997.

[51] Int. Cl.⁷ ........................................................ F16J 15/10
[52] U.S. Cl. .............................. 277/607; 285/4; 277/626; 277/644; 277/917
[58] Field of Search ...................................... 277/606, 607, 277/626, 630, 634, 644, 917; 285/4, 111, 110, 104

[56] References Cited

U.S. PATENT DOCUMENTS

| | | |
|---|---|---|
| 1,933,117 | 10/1933 | Markle . |
| 2,933,333 | 4/1960 | Bredtschneider et al. . |
| 3,391,951 | 7/1968 | Miller . |
| 3,844,585 | 10/1974 | Sands et al. . |
| 4,022,496 | 5/1977 | Crissy et al. . |
| 4,119,112 | 10/1978 | Adler . |
| 4,602,504 | 7/1986 | Barber . |
| 4,746,023 | 5/1988 | Belter . |
| 4,749,214 | 6/1988 | Hoskins et al. . |
| 4,805,932 | 2/1989 | Imhof . |
| 4,902,043 | 2/1990 | Zillig et al. . |
| 4,927,185 | 5/1990 | McNaughton . |
| 5,078,429 | 1/1992 | Braut et al. . |
| 5,286,040 | 2/1994 | Gavin . |
| 5,624,123 | 4/1997 | Meyers ........................................ 285/4 |

OTHER PUBLICATIONS

Article "High–Speen Sensors Need Less Maintenance" and "Breakaway Seal," *Machine Design*, Sep. 12, 1996, p. 40.
Article "Tube Plug Seal Cuts Out Brass Fittings," (author, name of publication, publication date, and place of publication unknown).

*Primary Examiner*—Anthony Knight
*Assistant Examiner*—Alison K. Pickard
*Attorney, Agent, or Firm*—Howard & Howard

[57] ABSTRACT

A tube plug seal has an improved tear line pattern which tears when a mating tube having a circumference smaller than the seal is inserted through the seal. The improved tear line pattern is designed to initially tear where the circumference of the mating tube applies the highest stress. As a result, the improved tear line includes a portion which extends at least partially circumferentially about an axial center point of the seal. More specifically, the circumferential portion of the improved tear line pattern generally aligns with a circumference of the mating tube. In one embodiment the improved tear line pattern is C-shaped.

20 Claims, 2 Drawing Sheets

TUBE PLUG SEAL

This application claims the benefit of U.S. Provisional Application No. 60/043,931, filed Apr. 21, 1997.

BACKGROUND OF THE INVENTION

The present invention relates generally to a tube plug seal having an improved tear line pattern.

Automotive transmissions are often filled with transmission fluid before they are shipped to an automobile assembly plant. To retain the fluid in the transmission during shipment, tube plug seals are press fit into fluid connection ports located in the housing of the transmission. Each tube plug seal typically includes a plurality of linear, tear lines which extend radially from a center point of the seal and which define a plurality of triangular-shaped flaps. The tear lines are weakened portions in the seal formed by reducing the thickness of the tube plug seal material. After installation of the transmission into the automobile, a mating tube is pushed through the tube plug seal thereby tearing the seal material along the tear lines and creating a passageway for fluid flow. In addition to plugging the fluid connection port prior to tearing, the tube plug seal must also provide a secure seal for the joint between the mating tube and the fluid connection port after the seal is torn.

Current tube plug seals have several shortcomings. Tube plug seals having a conventional tear line design may tear radially outward from the center point of the seal beyond the defined tear line, thus preventing the tube plug seal from acting as a secure seal between the mating tube and the fluid connection port. Further, the amount of force required to tear a conventional tube plug seal along its tear lines varies with temperature. Finally, insertion of the mating tube causes a high stress upon the seal along the circumference of the fluid connection port. The high stress may cause the seal to tear not only radially along the defined tear lines but also circumferentially along the circumference of the fluid connection port thereby detaching pieces of seal material from the plug. The detached pieces may then flow into the transmission causing contamination.

SUMMARY OF THE INVENTION

The present invention is a tube plug seal with an improved tear line pattern. The tear line tears when a mating tube is inserted through the seal. The improved tear line pattern is designed to initially tear where the circumference of the mating tube applies the highest stress. The improved tear line includes a portion which extends at least partially circumferentially about an axial center point of the seal. By extending at least partially circumferentially, Applicant means that the tear line is something other than the straight radial tear line of the prior art. Stated another way, the tear line extends in a direction with a component that is perpendicular to a radius.

More preferably, the circumferential portion of the improved tear line pattern generally aligns with a circumference of the mating tube. Thus, the tube circumference tears the tear line. The seal is then forced radially outwardly by the tube. In one embodiment the improved tear line pattern is C-shaped. In second and third embodiments the improved tear line includes a plurality of arms. Each arm extends generally radially from the axial center point of the seal and ends with an arc portion generally aligned with the circumference of the mating tube.

The present invention provides a tube plug seal with an improved tear pattern which requires less force to tear over a wide range of temperatures. Also, the inventive tube plug seal reduces the possibility of seal material detaching from the plug when the seal is torn. Also, the tube plug seal securely seals the fluid connection port-mating tube joint after the seal is torn.

The above features and advantages of the present invention will be readily apparent from the following detailed description of the best mode for carrying out the invention when taken in conjunction with the accompanying drawings.

DETAILED DESCRIPTION OF THE PRESENT INVENTION

Figure 1:
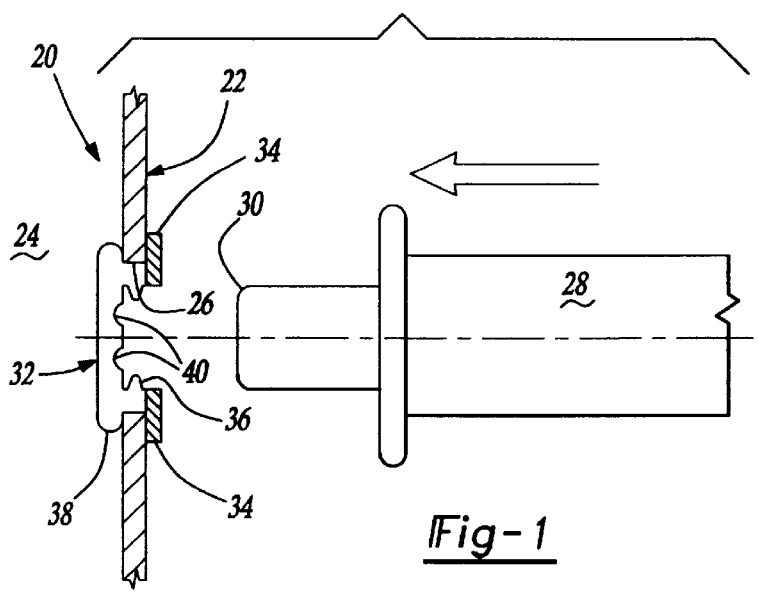
FIG. 1 is a cross-sectional view of a transmission assembly including a tube plug seal according to the present invention.

Referring to FIG. 1, the present invention provides a transmission assembly 20 including a transmission housing 22 filled with transmission fluid 24 and having at least one fluid opening 26. The transmission assembly 20 further includes a fluid tube 28, such as a cooling fluid tube leading to a transmission fluid cooler (not shown). The tube 28 includes an axially forward end 30 to be inserted into the fluid opening 26 of the transmission housing 22. A tube plug seal 32, preferably made of rubber, a fluoroelastamer, or other similar material, includes an axially outer portion 34 having an outer diameter greater than the diameter of fluid opening 26. The tube plug seal 32 further includes a mid portion 36 having an outer diameter which tightly fits within the fluid opening 26 and an inner diameter less than the outer diameter of the forward end 30 of tube 28. The tube plug seal 32 further includes an axially inner portion 38 having a diameter greater than the diameter of the fluid opening 26.

Figure 2:
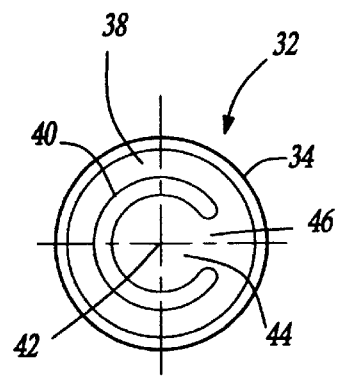
FIG. 2 is a front view of the tube plug seal of FIG. 1 showing an improved tear pattern.

As can be seen in FIG. 2, a tear line 40 extends circumferentially approximately 280° about an axial center 42 of the tube plug seal 32. The tear line 40 extends along a circular arc at a predetermined radial distance from the center 42 of the tube plug seal 32. The predetermined radial distance is less than the radius of the seal and greater than one-half the radius of the seal. Preferably, the predetermined radial distance is equal to the radius of tube 28. The length of tear line 40 is, of course, less than the circumference of tube plug seal 20 and greater than one-half the circumference of tube plug seal 20. The tear line 40 defines a secured web portion 44 which remains continuous with the inner portion 38 of the tube plug seal 32 by way of a hinge portion 46. Inner portion 38, secured web portion 44, and hinge portion 46 are of equal thickness, while tear line 40 is of a reduced thickness.

Figure 3:
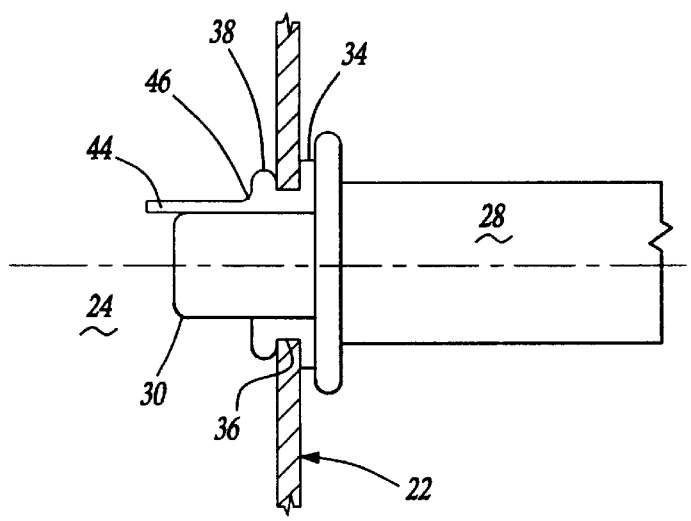
FIG. 3 is a cross-sectional view of the transmission assembly of FIG. 1 with a mating tube shown inserted through the tube plug seal and into the transmission assembly.

As can be seen in FIG. 3, when the tube 28 is inserted into the transmission housing 22, the forward end 30 of the tube 28 contacts the tear line 40 of the tube plug seal 32, causing the tube plug seal 32 to tear along tear line 40, permitting transmission fluid 24 to flow into tube 28. The secured web portion 44 is retained by the hinge portion 46 to the inner portion 38 of the tube plug seal 32. Further, the outer portion 34, the mid portion 36 and the inner portion 38 form a seal between the tube 28 and the transmission housing 22. Because the tear line 40 is generally aligned with the forward end 30 of the tube 28, the highest stress is placed directly on the tear line 40. As a result, the tearing of the tube plug seal 32 is controlled and more consistent over a range of temperatures.

Figure 4:
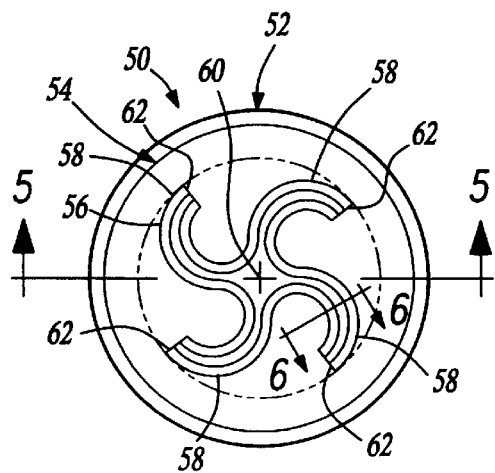
FIG. 4 is a front view of a second embodiment of a tube plug seal showing an alternative tear pattern.

A second embodiment of a tube plug seal with an alternative improved tear pattern is shown in FIG. 4. Tube plug seal 50 includes a steel outer ring 52 and an inner portion 54, which is preferably rubber, a fluoroelastamer, or other similar material. The inner portion 54 includes a tear line 56 having a plurality of arms 58. Each arm 58 extends circumferentially along an arc from an inner end adjacent to the axial center 60 of the seal 50, and to an outer end 62. Preferably, the curve of the arc at and near each outer end 62 is parallel to the circumference of the seal 50. During insertion of the tube 28, the outer ends 62 are contacted by the forward end 30 of the tube 28. Therefore, the highest stress is placed directly on the outer ends 62. The initial tearing of each arm 58 begins circumferentially at its respective outer end 62 and continues radially inward along the arm toward the axial center 60.

Figure 5:
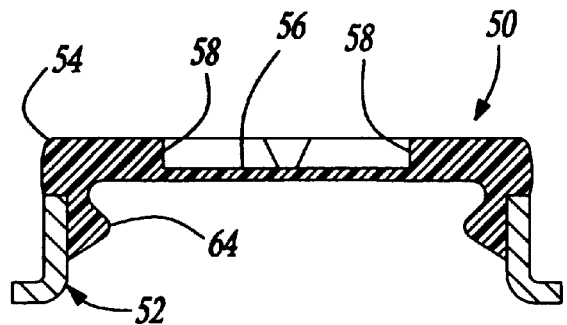
FIG. 5 is a cross-sectional view taken along lines 5—5 in FIG. 4.

FIG. 5 shows a cross-sectional view of the tube plug seal 50. The tube plug seal 50 includes an inwardly projecting annular seal portion 64. The tear line 56 has a reduced thickness to provide a weakened portion which will tear upon insertion of the tube 28.

Figure 6:
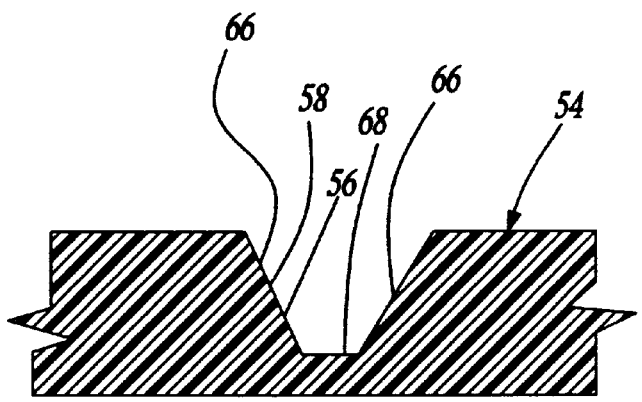
FIG. 6 is a cross-sectional view taken along lines 6—6 in FIG. 4.

FIG. 6 shows a cross-sectional view through an arm 58. Each arm 58 includes side walls 66 tapering to a bottom wall 68 of reduced thickness relative to the remainder of the inner portion 54 of the tube plug seal 50. Preferably, the thickness of the bottom wall 68 is less than one-quarter the thickness of the inner portion 54 of the tube plug seal 50.

Figure 7:
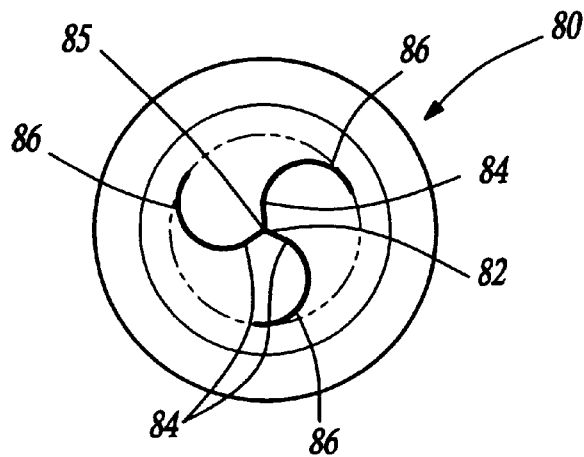
FIG. 7 is a front view of a third embodiment of a tube plug seal showing an alternative tear pattern.

A third embodiment of a tube plug seal having an alternative tear pattern is shown in FIG. 7. Tube plug seal 80 includes a tear line 82 having three arms 84. Each arm 84 extends radially along an arc from an axial center 85 of the seal 80 to an outer end 86 respectively. Preferably, the curve of the arc at and near each outer end 86 is parallel to the circumference of the seal 80. During insertion of the tube 28, the outer ends 86 are generally contacted by the forward end 30 of the tube 28. Therefore, the highest stress is placed directly on the outer ends 86. The initial tearing of each arm 84 begins circumferentially at its respective outer end 86 and continues radially inward along the arm toward the axial center 85. It should be apparent that the tear line could include any number of arms, however three arms or four arms are preferred.

It should be apparent that the tube plug seal of the present invention can be used to seal any fluid container before insertion of a tube or other similar tubulus structure. The tube plug seal of the present invention could also be used for any fluid handling system, such as power steering, engine oil, engine coolant or power brake systems.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A tube plug comprising:
   a body having a central portion for enclosing and opening;
   a tear line formed in said central portion extending at least partially circumferentially relative to an axial center point of the seal, at least a portion of said circumferentially extending tear line being at a location aligned with an outer diameter of a tube which is to be mounted within said tube plug seal; and
   structure for securing said seal in the opening.

2. The tube plug seal of claim 1 wherein said tear line is C-shaped.

3. The tube plug seal of claim 2 wherein said tear line extends along an arc at a predetermined radial distance from the axial center point of the seal.

4. The tube plug seal of claim 3 wherein the predetermined radial distance is less than a radius of the seal and greater than one-half the radius of the seal.

5. The tube plug seal of claim 4 wherein the length of said tear line is less than a circumference of the seal and greater than one-half the circumference of the seal.

6. The tube plug seal of claim 5 wherein said tear line is of a reduced material thickness with respect to the remaining portion of the seal.

7. The tube plug seal of claim 1 wherein said tear line is comprised of a plurality of arms.

8. The tube plug seal of claim 7 wherein each of said plurality of arms extends generally radially from the axial center point of the seal to an outer end.

9. The tube plug seal of claim 8 wherein said outer end of each of said arms is continuous with an arc generally parallel to an outer circumference of the seal.

10. The tube plug seal of claim 9 wherein said plurality of arms comprises three arms.

11. A tube plug seal and mating tube comprising:
    a tube having a forward end with a predetermined circumference; and
    a tube plug seal having a tear line, said tear line including a circumferential portion aligning with the predetermined circumference of said tube and tearing along said circumferential portion as the mating tube is inserted into and through the tube plug seal.

12. The combination of claim 11 wherein said tear line is C-shaped extending along an arc at a predetermined radial distance from an axial center point of said tube plug seal.

13. The combination of claim 11 wherein the tear line is comprised of a plurality of arms, each extending generally radially from an axial center of said tube plug seal to an outer end.

14. A fluid handling system comprising:
    a tube having a forward end with a predetermined circumference;
    a housing containing fluid, the housing including a fluid port; and
    a tube plug seal disposed in the fluid port, the tube plug seal having a tear line including a portion extending at least partially circumferentially, aligning with the predetermined circumference of said tube and tearing as said tube is inserted into and through the tube plug seal.

15. The fluid handling system of claim 14 wherein said tear line is C-shaped extending along an arc at a predetermined radial distance from an axial center point of the tube plug seal.

16. The fluid handling system of claim 14 wherein said tear line is comprised of a plurality of arms, each of the plurality of arms extending generally radially from an axial center of the tube plug seal to an outer end.

17. The fluid handling system of claim 16 wherein the outer end of each arm is continuous with an arc defining the circumferential portion of the tube plug seal.

18. The fluid handling system of claim 14 wherein the tube plug seal includes an outer lip having an outer diameter greater than the diameter of the fluid port to prevent the tube plug seal from moving through the fluid port and into the housing.

19. The fluid handling system of claim 18 wherein the tube plug seal includes a mid portion having an outer diameter equal to the diameter of the fluid port and the inner diameter equal to or less than the outer diameter of the forward end of the tube.

20. The fluid handling system of claim 19 wherein the tube plug seal includes an inner lip having an outer diameter greater than the diameter of the fluid port to allow the tube plug seal to be press fit into the fluid port and to prevent gravity from moving the tube plug seal out of the fluid port.

* * * * *